United States Patent [19]
Kota et al.

[11] Patent Number: 5,435,790
[45] Date of Patent: Jul. 25, 1995

[54] PLURAL OUTPUT DIFFERENTIAL DRIVE WITH COAXIAL SHAFTS

[75] Inventors: Sridhar Kota, Brighton; Srinivas R. Bidare, Ann Arbor, both of Mich.

[73] Assignee: Aeromover Systems Corporation, Dexter, Mich.

[21] Appl. No.: 97,837

[22] Filed: Jul. 26, 1993

Related U.S. Application Data

[63] Continuation of Ser. No. 793,516, Nov. 18, 1991, abandoned.

[51] Int. Cl.⁶ .......................... F16H 1/38; F16H 1/44
[52] U.S. Cl. ............................ 475/221; 475/206; 475/205
[58] Field of Search ........................ 475/204–206, 475/219, 221, 230, 248, 332

[56] References Cited

U.S. PATENT DOCUMENTS

| | | | |
|---|---|---|---|
| 1,468,338 | 9/1923 | Wyman | 475/221 |
| 1,686,431 | 10/1928 | Wyman | 475/221 |
| 2,828,650 | 4/1958 | Hutter et al. | 475/221 |
| 2,832,233 | 4/1958 | Allgaier et al. | 475/221 |
| 4,856,372 | 8/1989 | Williamson | 475/206 |
| 5,176,589 | 1/1993 | Borgudd | 475/221 |

FOREIGN PATENT DOCUMENTS

| | | | |
|---|---|---|---|
| 439189 | 1/1927 | Germany | 475/221 |
| 257837 | 9/1926 | United Kingdom | 475/204 |

*Primary Examiner*—Dirk Wright
*Assistant Examiner*—Khoi Q. Ta
*Attorney, Agent, or Firm*—Rohm & Monsanto

[57] ABSTRACT

A plural output differential drive system provides plural outputs that are differentially related to each other. Three or more output shafts are driven from a single input shaft, each output shaft being differentially linked with the other output shafts. The entire differential drive arrangement is contained within a single housing. The output shafts of the plural output differential will transfer power in applications wherein equal distribution of torque is required at three or more outputs. The input shaft may be arranged to be coaxial with the output shafts, or may be at any other angle, including orthogonal thereto. Typical applications include powering three or more live axles on vehicles, providing rotary power for developing equal torques for simultaneously tightening multiple bolts, and generating equal forces on the gripper fingers of robotic hands. In addition, the outputs can be applied to leveling devices where three or more legs must apply equal pressures on a surface. Differential action is made available to each of the tandem wheels of a truck vehicle, in one embodiment of the invention.

9 Claims, 6 Drawing Sheets

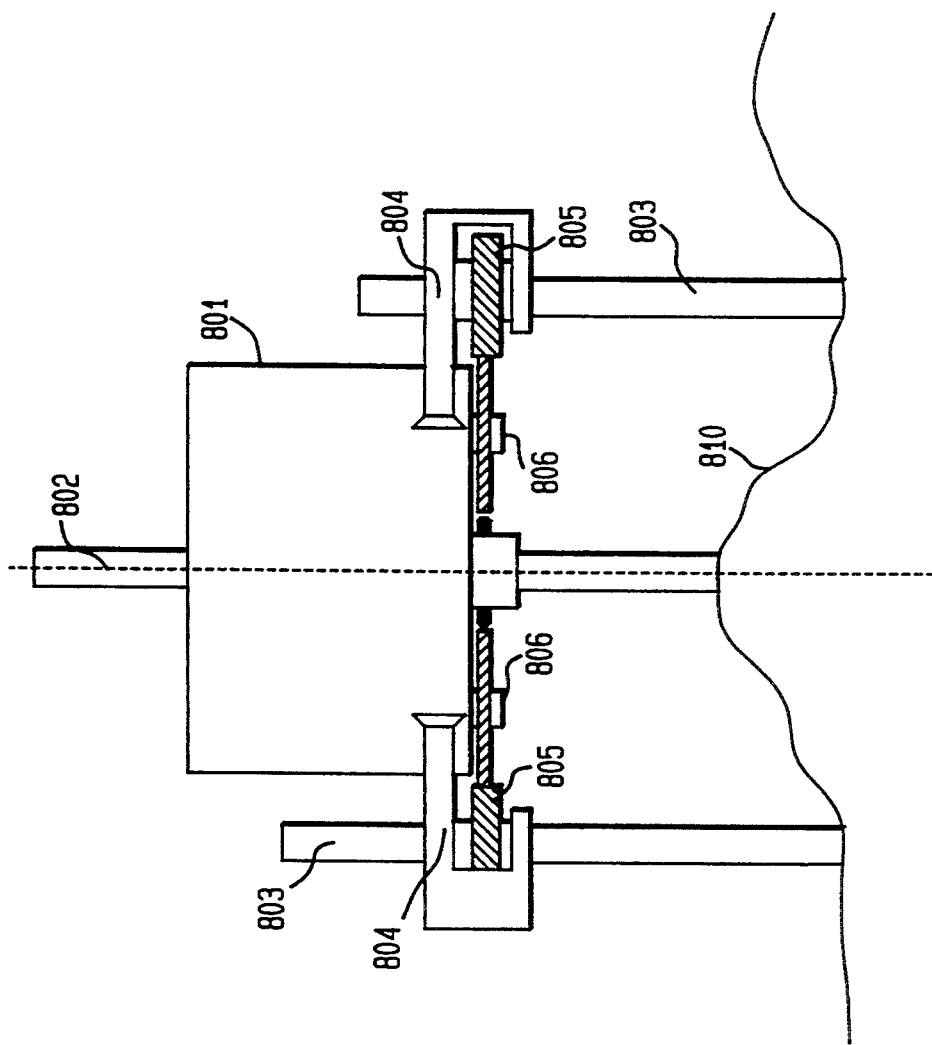

PLURAL OUTPUT DIFFERENTIAL DRIVE WITH COAXIAL SHAFTS

RELATIONSHIP TO OTHER APPLICATION

This application is a continuation of U.S. Ser. No. 07/793,516, filed Nov. 18, 1991, now abandoned the disclosure of which is incorporated herein by reference.

BACKGROUND OF THE INVENTION

1. Field of the Invention

This invention relates to differential drive mechanisms, and more particularly, to a mechanical drive mechanism that has plural differentially related outputs responsive to a single rotatory input which causes rotation of three or more rotary outputs that are differentially related, whereby the rotary outputs rotate simultaneously until resistance is encountered on one or more of the rotary outputs causing same to stop rotating until the unloaded outputs encounter resistance, and such rotary outputs will continue to rotate until all of the outputs develop equal torque.

2. Description of the Related Art

A differential drive arrangement is commonly used in a vehicular application. This is a device that divides the input torque from the propeller shaft equally between two output shafts to the drive wheels. Such division occurs irrespectively of whether the drive wheels of the vehicle are rotating at different speeds. Such a speed differential will occur, for instance, on rounding a corner. In applications where the differential divides the input torque equally among the elements that are being subjected to torque, the division occurs independently of the speeds at which they are rotating.

Conventional differential gearing mechanisms have a single input shaft with a pinion gear attached thereto that drives a crown gear fixed to a carrier or cage that contains a set of spider gears or other differentiating mechanism by which two outputs may be derived. If more than two outputs are required, a second differential system in a separate housing is required to be connected in tandem with the first. To maintain an equal distribution of torque at all final outputs, all such differential systems must be assembled such that the two outputs of a primary differential arrangement drives the inputs of two other secondary differential arrangements. As demonstrable mathematically, such an arrangement of differentials results in the total number of outputs being equal to $2^n$, i.e., 2, 4, 8, 16, etc. Any other combination of differentials will not yield equal torque outputs.

A standard differential that can develop equal torques will have both bevel gears of same size, and the bevel pinions of equal size as well. In the current state of the art, the provision of four differentially related outputs, as required in a four-wheel-drive vehicle, will require the use of three standard differentials that will be contained in separate but connected casings.

There is a need in the art for a series connection of differential mechanisms that will provide odd or even numbers of outputs, all such outputs being differentially related to each other. There is additionally a need for a multi-output differential drive arrangement that provides equal torques at all outputs irrespective of output speeds.

It is believed that there are no methods or arrangements in the art that provide multiple outputs, e.g., three or more outputs from a single integrated differential mechanism enclosed in a single housing, and that will provide equal or predeterminably unequal torques at all outputs irrespective of the speeds of the output shafts.

It is therefore an object of this invention to provide a system for providing differential action in which more than two differentially related outputs may be derived from a single input.

It is another object of this invention to provide an arrangement that can easily and simply be designed to provide four differentially related outputs from a single input, the arrangement being contained within a single housing, to reduce the size and expense of the arrangement, while simultaneously simplifying placement of the arrangement in various applications.

It is yet another object of this invention to provide differentially geared linear motion as may be required for pressure sensitive leveling operation against uneven and variable density surfaces and providing such capability using only one load sensing device.

It is additionally an object of this invention to provide differentially distributed torque among three or more outputs as may be required in simultaneous tightening of bolts and providing such capability using only one load sensing device.

It is a further object of this invention to provide differentially geared motion to three or more outputs such as, but not limited to, actuation of machine or robotic gripper fingers.

It is still another object of this invention to provide a system of differentially geared outputs to concentric output shafts from a single input shaft through a plural output differential such as may be applied to, but not limited to, multiple output drives in vehicle applications.

A still further object of this invention is to increase power transmission efficiency and durability while reducing in the cost of manufacturing and maintenance.

An additional object of this invention is to eliminate the need for multiple differential housings when providing three or more differential outputs.

Yet another object of this invention is to reduce the number of components required to construct a single differential drive system that provides three or more outputs.

SUMMARY OF THE INVENTION

The foregoing and other objects are achieved by this invention which provides a plural output differential enclosed in a single housing that provides specific division of torque from a single input to three or more outputs such that all the outputs are differentially related. This invention is a novel combination of an epicyclic geared differentiating mechanisms in series with a bevel-geared differentiating mechanism. The epicyclic differentiating mechanism is made of a sun gear meshing with one or more planet gears which in turn mesh with a ring gear. The planet gears are carried on stub shafts rigidly connected to an arm. The epicyclic geared differentiating mechanism constitutes a differential stage. The input is given to the arm of the first stage which is an epicyclic geared differentiating mechanism. The second stage is a bevel geared differentiating mechanism composed of two planet bevel gears meshing with two sun planet gears, all housed in a primary carrier. The outputs are derived from the bevel sun gears. The ring gear of the epicyclic gear differentiating mechanism is rigidly connected to the primary carrier of the last stage or bevel gear differentiating mechanism. The series connection of an epicyclic gear differentiating mechanism with a bevel gear differentiating mechanism provides equal torque distribution to any number of outputs. However, in some embodiments of the invention, the gear ratios can be modified to obtain unequal torque distributions as desired.

In accordance with a specific aspect of the invention, there is provided a differential drive arrangement of the type having an input for receiving a rotatory input drive and a plurality of outputs. Each of the outputs produces a respective rotary output drive in response to the rotatory input drive, the rotary output drives being differentially related to one another. The differential drive arrangement is further provided with a planetary carrier for receiving the rotatory input drive. A plurality of planetary gears are coupled to the planetary carrier, each of the planetary gears being rotatable in a plane of rotation. A sun gear for meshing with the plurality of planetary gears, and is rotatable in a plane of rotation that is parallel to that of the planetary gears. A first output shaft provides a first one of the rotary output drives, the first output shaft being coupled to the sun gear. Furthermore, the sun gear is rotatable about an axis that is orthogonal to the plane of rotation of the sun gear. A ring gear is provided for meshing with the plurality of planetary gears, the ring gear being arranged to rotate coaxially with the sun gear. A first bevel sun gear arranged concentrically with the first output shaft is provided to rotate in a plane of rotation that is orthogonal to the axis of the first output shaft. A second output shaft for providing a second one of the rotary output drives is coupled to the first bevel sun gear, and is arranged to be coaxial with first output shaft. A second bevel sun gear is arranged coaxially with the first output shaft and is arranged to rotate in a plane of rotation that is parallel to that of the first bevel sun gear. A third output shaft provides a third one of the rotary output drives. The third output shaft is coupled to the second bevel sun gear, and is arranged to be coaxial with the rotatory input drive and the first output shaft. There is further provided a planetary bevel gear for meshing with the first and second sun bevel gears, the planetary bevel gear being arranged to rotate in a plane of rotation that is orthogonal to the planes of rotation of the first and second bevel sun gears. There is additionally provided a carrier member affixed to the ring gear for rotating therewith. The carrier member is further coupled to the planetary bevel gear, which is angularly displaceable about the axis of rotation of the first output shaft in response to the rotation of the ring gear.

In one embodiment of the invention, the differential drive arrangement is further provided an input shaft for providing the rotatory input drive. As will be described herein with respect to some embodiments, the rotatory input is coaxial with the output shafts. However, in other embodiments, the input shaft may be arranged at any angle with respect to the output shafts, including orthogonal thereto, and the determination of an appropriate angle for any given application of the invention is within the ability of a person of ordinary skill in the art. A single cavity housing is further provided having a first end for receiving the input shaft and a second end for accommodating the first, second, and third output shafts. In a further embodiment, the first, second, and third output shafts are concentric with respect to each other.

There is provided, in a specific embodiment and application of the invention, a translation arrangement for convening a rotary motion of one of the output shafts into a linear motion. Such a translation arrangement can be configured within the capability of a person having ordinary skill in the art, and will find significant utility in embodiments where there is a need to apply equal or otherwise predetermined ratios of leveling forces.

In accordance with a further aspect of the invention which is particularly suitable for providing differential action to each of the tandem wheels of a truck vehicle, the four wheels being arranged in first and second pairs of substantially parallel and coaxial wheels, the differential drive arrangement is of the type having an input shaft for receiving a rotatory input from the drive motor of the truck vehicle, and a plurality of output shafts, each for producing a respective rotary output drive in response to the rotatory input from the drive motor. As stated, the rotary output drives are differentially related to one another. In accordance with this aspect of the invention, a first compound planar-meshing planetary gear system has a first major sun gear, a first minor sun gear, and a first compound planetary gear meshing with the first major and minor sun gears. A second compound planar-meshing planetary gear system has a second major sun gear, a second minor sun gear, and a second compound planetary gear meshing with the second major and minor sun gears. Them is additionally provided an input coupler for coupling the first and second compound planetary gears to the input shaft, the input coupler further forming a carrier housing that is intermediate of the first and second planar-meshing planetary gear systems. The carrier housing is rotatable in response to the input shaft. A bevel-meshing planetary gear system having first and second bevel-meshing sun gears arranged concentrically and in parallel with respect to one another is provided. This bevel-meshing planetary gear system further has at least one bevel-meshing planetary gear arranged to mesh with the first and second bevel-meshing sun gears, each of the first and second bevel-meshing sun gears being coupled with a respective one of the first and second minor sun gears. A carrier coupler couples with the bevel-meshing planetary gear and the carrier housing of the input coupler. A first pair of output shafts is arranged concentrically with respect to one another and extend in a first direction, each of the first pair of output shafts being coupled to a respective one of the first major sun gear and the first bevel-meshing sun gear. Additionally, there is provided a second pair of output shafts also arranged concentrically with respect to one another and extending in a second direction, each of the second pair of output shafts being coupled to a respective one of the, second major sun gear and the second bevel-meshing sun gear.

In a particularly advantageous embodiment, the planar-meshing planetary gear train is an epicyclic gear differentiating system.

In a further embodiment of this aspect of the invention, there are further provided a first wheel coupler arrangement for coupling the first pair of output shafts to the dual wheels on one side of the truck vehicle, and a second wheel coupler arrangement for coupling the second pair of output shafts to the dual wheels on the other side of the truck vehicle. Thus, each of the tandem wheels has individual differential capacity.

In accordance with a still further aspect of the invention, a plural output differential is of the type having a single input shaft, and the plural output differential is provided with at least three differentially related output shafts, a single housing for substantially enclosing the plural output differential, and at least two carrier arms disposed within the housing and coupled to the single input shaft. There is also provided a first epicyclic gear train stage having at least two planet gears mounted on the carrier arms, a sun gear for meshing with the planet gears; the sun gear having internal splines, a first output shaft engaged with the internal splines of the sun gear and extending out of the single housing, the first output shaft being arranged to be coaxial with the single input shaft, and a ring gear for meshing with the planet gears. A carrier arrangement is rigidly attached to a the ring gear. The carrier arrangement is freely rotatable about the first output shaft and being mounted on the housing supported on a bearing. Two bevel planet gears are contained within the carrier arrangement at diametrically opposite ends thereof and are rotatable about an axis that is orthogonal to that of the first output shaft. A bearing support cage rotatably supports the two bevel planet gears that also are internally mounted on the bearing support cage. The bearing support cage is hollow in the direction of the first output shaft to allow the first output shaft to pass therethrough. First and second bevel sun gears are provided for meshing with the two bevel planet gears and are arranged to be rotatable about the axis of rotation of the first output shaft. The first and second bevel sun gears being internally splined. Second and third output shafts are provided, the second output shaft being engaged with the internal splines of the first bevel sun gear, and the third output shaft being engaged with the internal splines of the second bevel sun gear. The first, second, and third output shafts are arranged to be mutually concentric.

BRIEF DESCRIPTION OF THE DRAWING

Comprehension of the invention is facilitated by reading the following detailed description, in conjunction with the annexed drawing, in which:

FIG. 6 is a representation of a leveler embodiment of the invention.

DETAILED DESCRIPTION

Figure 1:
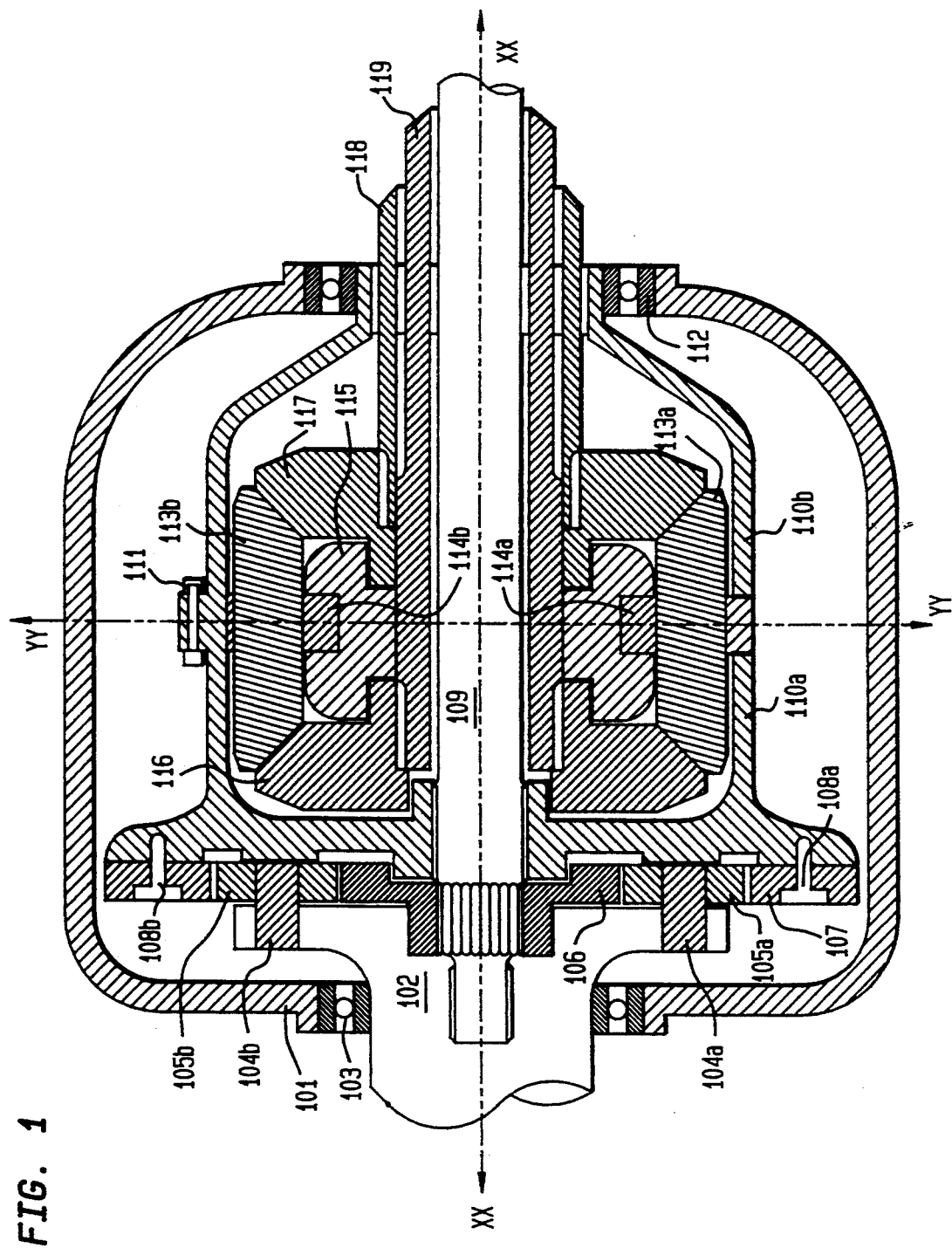
FIG. 1 shows a three output differential housed in a single housing wherein the three outputs are concentric.

In FIG. 1 a single housing 101 encloses the entire differential. An input shaft 102 is mounted on the housing using a bearing 103, the input shaft having two or more arms that carry two or more planet gears 105a and 105b at diametrically opposite ends via stub shafts 104a and 104b, the planet gear mesh with a sun gear 106, the sun gear having internal splines to engage with an output shaft 109. Output shaft 109 extends out of the sun gear and, in this specific illustrative embodiment, is partially accommodated within input shaft 102. Planet gears 105a and 105b also mesh with a ring gear 107, the ring gear being mounted on a primary carrier 110a via two or more bolts 108a and 108b.

Primary carrier 110a is mounted on output shaft 109 and rotates freely with respect thereto. The primary carrier is bolted rigidly to a secondary carrier 110b using two or more bolts 111. The secondary carrier is mounted on housing 101 using a bearing 112. The primary and secondary carriers jointly house two bevel planet gears 113a and 113b at diametrically opposite ends, the bevel planet gears being mounted on two stub shafts 114a and 114b. The stub shafts are rotatable about the YY axis and are internally mounted on a bearing support cage 115 that is hollow along the XX axis. The bevel planet gears mesh with two bevel sun gears 116 and 117 that are rotatable on the XX axis. Bevel sun gear 116 is internally splined and is engaged with an output shaft 119. Bevel sun gear 117 is also internally splined and is engaged with an output shaft 118. All three output shafts 109, 118, 119 are rotatable about the XX axis, and are concentric with respect to one another. The output shafts are mutually spaced by bush bearings.

An input drive, is provided at input shaft 102, that responsively rotates about the XX axis carrying with it the planet gears 105a and 105b. The rotation of the input shaft also causes ring gear 107 and sun gear 106 to rotate about the XX axis. The rotation of the sun gear causes output shaft 109 to rotate about the XX axis, and the rotation of ring gear 107 causes primary carrier 110a and secondary carrier 110b also to rotate about the XX axis. The rotation of the primary and secondary carriers causes bevel planet gears 113a and 113b to revolve about the XX axis, and this causes bevel sun gears 116 and 117 to rotate about the XX axis. The rotation of the bevel sun gears causes output shafts 119 and 118 to rotate about the XX axis.

If an attempt is made to slow output shaft 109, the slowing of the shaft causes sun gear 106 to slow. The slowing of the sun gear causes ring gear 107 to speed up, which causes the speeding of the rotation of primary carrier 110a and secondary carrier 110b. The speeding of the primary carrier and secondary carriers causes the speeding of bevel planet gears 113a and 113b about the XX axis, which causes the speeding of bevel sun gears 116 and 107. Consequently, the speeding of the bevel sun gears causes output shafts 119 and 118 to speed up.

If an attempt is made to slow output shaft 109 with the slowing of output shaft 119, the slowing of shaft 119 causes bevel sun gear 116 to slow. The slowing of the bevel sun gear causes the rotation of bevel planet gears 113a and 113b about the YY axis. The slowing of output shaft 109 causes sun gear 106 to slow, resulting in ring gear 107 speeding up. The speeding of the ring fear causes the speeding of primary carrier 110a and secondary carrier 110b. The rotation of the bevel planet gear about the YY axis, combined with the speeding of primary carder 110a and secondary carrier 110b causes the speeding of bevel sun gear 117, which causes the speeding of output shaft 118 about the XX axis.

Figure 2:
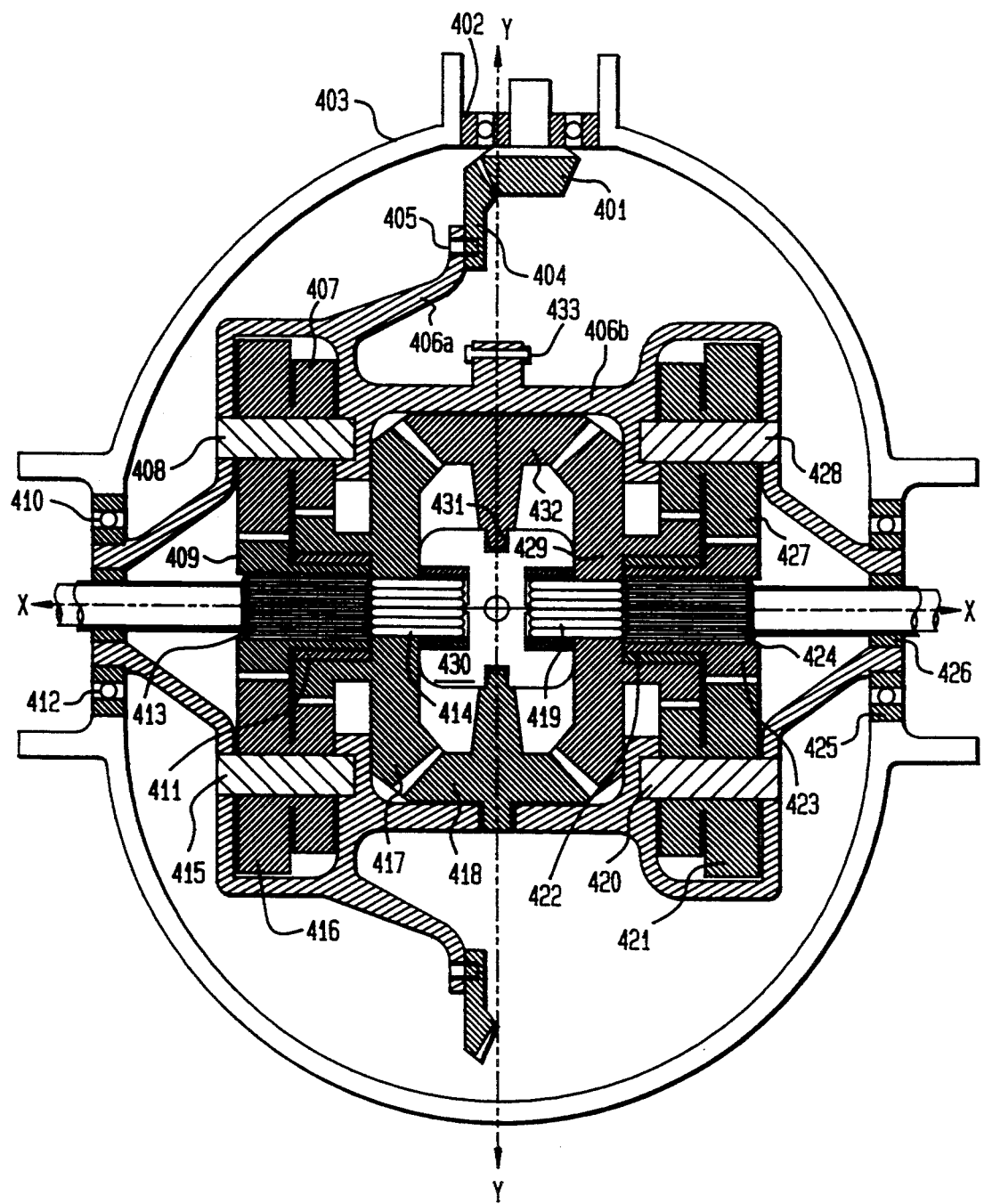
FIG. 2 shows a four output embodiment of a differential wherein an input shaft is orthogonal to the concentric output shafts and the entire differential is contained within a single cavity housing.
Figure 3:
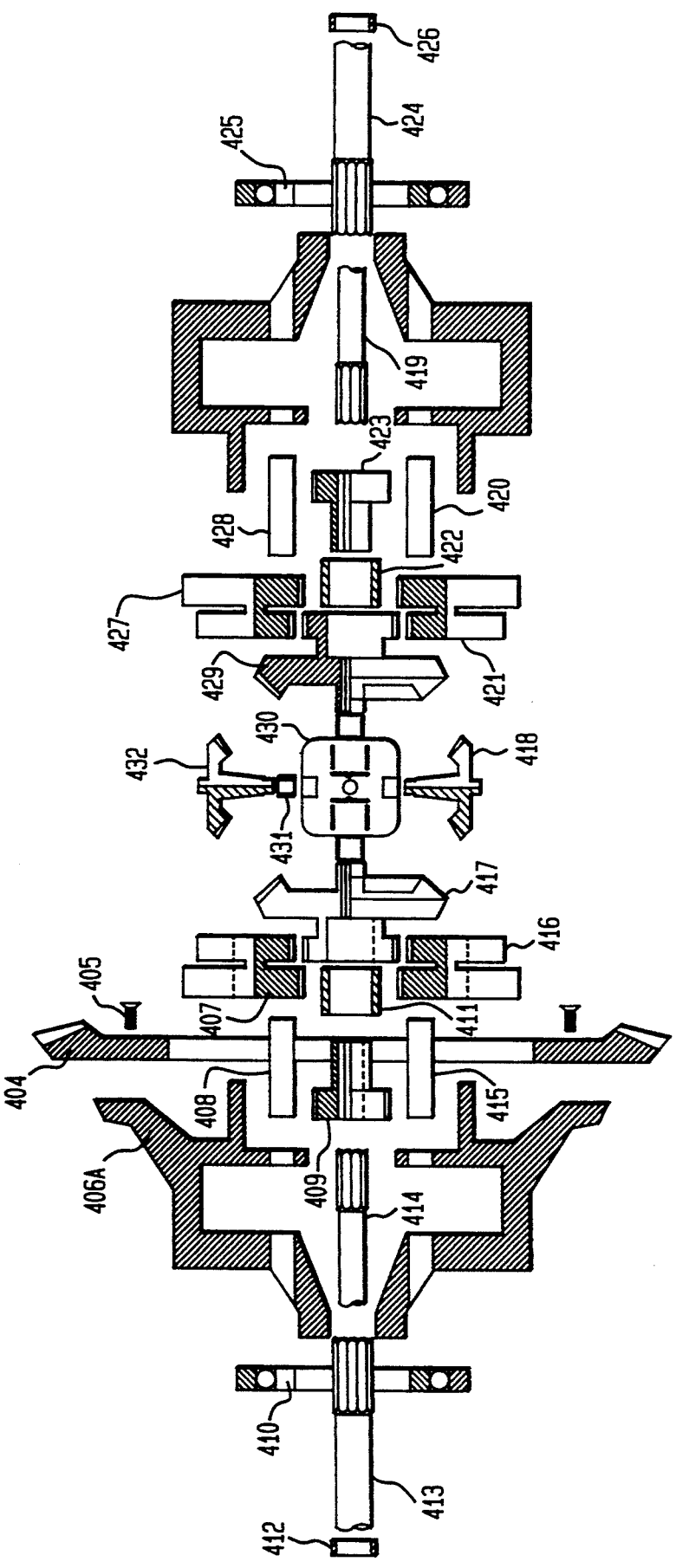
FIG. 3 shows an exploded representation of the embodiment of FIG. 2.

In FIG. 2, a single housing 403 encloses the entire differential drive arrangement. FIG. 3 shows the embodiment of FIG. 2 in an exploded form. In both of these figures, the elements of structure are correspondingly designated. As shown in FIG. 2, housing 403 has an input shaft 401 therethrough, the input shaft, in this embodiment, being mounted on the housing by a bearing 402. The input shaft is shown to have a pinion gear that meshes with a crown gear 404. As shown in FIGS. 2 and 3, crown gear 404 is rigidly connected to a primary carrier 406a by bolts 405. The primary carrier is carried by housing 403, and is separated from the housing by a bearing 410.

The primary carrier is rigidly bolted to a secondary carrier 406b by two or more bolts 433, the secondary carrier 406b by two or more bolts 433. Secondary carrier 406b is also carried by housing 403 and is separated therefrom by a bearing 425. Primary carrier 406a and secondary carrier 406b jointly house two bevel planet gears 432 and 418 at diametrically opposite ends. The bevel planet gears are also internally mounted on a bearing support cage 430. Bearing support cage 430 also supports bevel sun gears 417 and 429. Bevel sun gear 417 is splined internally and is engaged with an inner output shaft 414. Similarly, bevel sun gear 429 is splined internally and is engaged with an inner output shaft 419.

Bevel sun gear 417 has a distal gear portion that meshes with two or more compound gears 407 and 416. Similarly, bevel sun gear 429 meshes at its distal portion with two or more compound gears 421 and 427. Compound gears 407, 416, 421 and 427 are rotatable about two or more stub shafts 408, 415, 420 and 428 mounted on the primary carrier and secondary carrier. In addition, compound gears 407 and 416 mesh with an outer sun gear 409, and compound gears 421 and 427 mesh with an outer sun gear 423. Outer sun gear 409 is internally splined and is engaged with outer output shaft 413. Outer sun gear 423 is also internally splined and is engaged with outer output shaft 424. Shafts 413 and 414 are concentric, as are output shafts 419 and 424 are concentric.

A rotatory input is provided, illustratively by an engine (not shown) to input shaft 401. The input shaft rotates the crown gear 404, the crown gear 404 rotates the primary carrier 406a about the X axis. The primary carrier and secondary carriers carry bevel planet gears 432 and 418 and cause same to revolve about the X axis. The primary and secondary carriers also carry stub shafts 408, 415, 420, and 428 and cause them to revolve about the X axis. The bevel planet gear rotates bevel sun gears 417 and 429 about the X axis. Also, stub shafts 408, 415, 420, and 428 rotate compound gears 407, 416, 421 and 427, that cause outer sun gears 409 and 423. The outer sun gears rotate, output shafts 413 and 424 about the X axis, and the bevel sun gears rotate the output shafts 414 and 419 about the X axis.

If an attempt is made to slow output shaft 413, outer sun gear 409 is slowed down. The slowing of the outer sun gear causes compound gear 407 to rotate, the rotation of which causes the slowing of bevel sun gear 417. The ratio of slowing between the outer sun gear and the bevel sun gear is controlled by the gear ratio of the compound gear. The slowing of the bevel sun gear causes output shaft 414 to slow. The slowing of the bevel sun gear causes the bevel planet gear to rotate, which causes the speeding of bevel sun gear 429. The speeding of the bevel sun gear causes the speeding of output shaft 419. The speeding of the bevel sun gear causes the rotation of compound gear 417 which causes the speeding of outer sun gear 423. The speeding of the outer sun gear causes speeding of output shaft 424, the ratio of speeding between the output shaft 419 and 424 being dependent on the gear ratio of compound gear 427.

Figure 4:
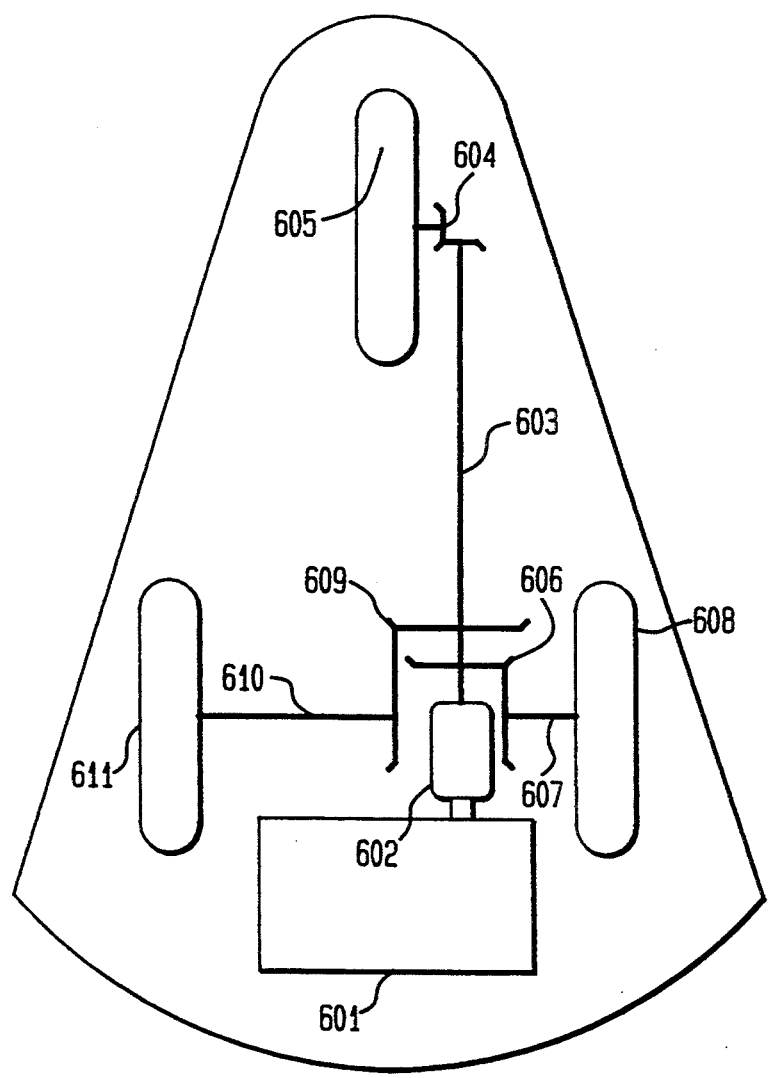
FIG. 4 is a schematic representation of an illustrative application of the three output embodiment of the invention in a three-wheeled vehicle.

FIG. 4 is a schematic representation that illustrates the manner in which a three output differential drive, such as that shown hereinabove in FIG. 1 can be employed in a three-wheeled vehicle. As shown in FIG. 4, a three output differential drive arrangement 602 receives a rotatory input from a drive motor 601. A first output of three output differential drive arrangement 602 is coupled to a drive shaft 603 that is engaged with a right angle drive 604. The right angle drive rotates a wheel 605.

A second output of the three output differential drive arrangement is conducted to a right angle drive 606 that drives a wheel 608 via a drive shaft 607. Similarly, the third output of the three output differential drive arrangement is conducted to a right angle drive 609 that drives a wheel 611 via a drive shaft 610.

Figure 5:
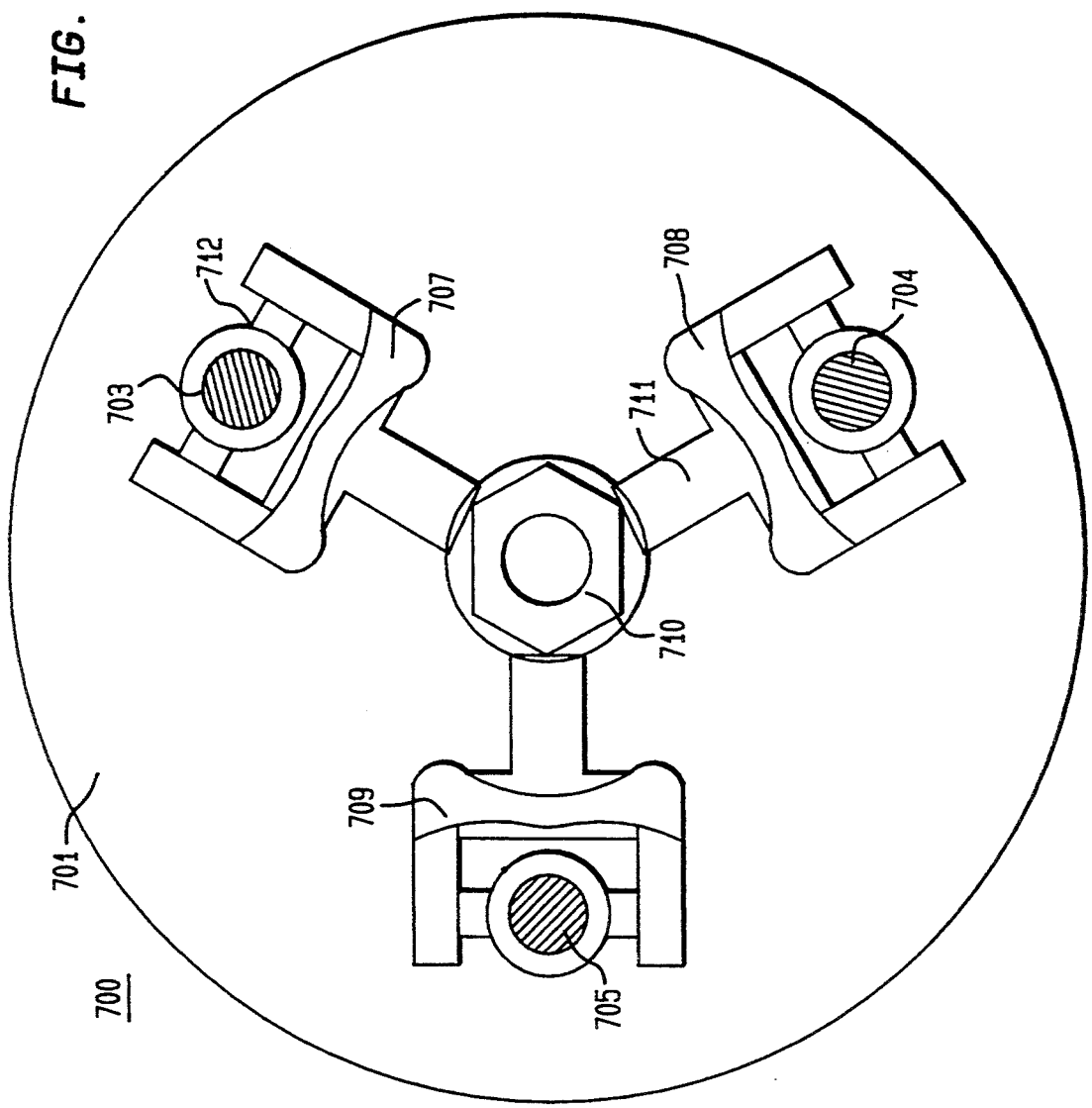
FIG. 5 is a partially cross-sectional schematic representation of a robotic gripper embodiment of the invention.

FIG. 5 is a partially cross-sectional schematic representation of a robotic gripper embodiment of the invention. As shown, a gripper 700 is installed on a gearbox 701 that contains therein a three output differential drive (not shown) as described herein, and which is geared to produce three equally-spaced shafts 703, 704, and 705. The rotation of each such shaft is differentially related to the rotation of each of the other shafts, as described hereinabove.

Gripper 700 is provided with three gripper fingers 707, 708, and 709, that are arranged to extend outward toward the reader. The fingers are hinged from a central hub 710 which, in this embodiment, is bolted to gearbox 701. In operation, as shafts 703, 704, and 705 are rotated, the gripper fingers are urged radially inward or outward, depending upon the direction of rotation of the shafts. As a resistance is encountered by any one of the gripper fingers, the other gripper fingers will continue to travel until the torque on each of the shafts is equalized.

FIG. 6 is a plan view of a leveler embodiment of the invention. As shown, a gearbox 801 receives a rotatory input via an input shaft 802. The gearbox is coupled to screw legs 803 which, in this embodiment, are keyed with leg support brackets 804 to prevent rotation of the screw legs. Each of the legs is engaged with a gear cum nut 805 which is coupled to rotate with a respective one of output shafts 806 extending from the gearbox. In this embodiment, a gear coupling is shown for purposes of illustration.

The combination of screw legs 803 with the leg support brackets and the coupling to the output shafts constitutes a translation arrangement which converts the rotary motion of the output shafts to the linear motion of the screw legs. Each leg, therefore, will exert an equal force on surface 810, notwithstanding that such surface is uneven.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A differential drive arrangement of the type having an input for receiving a rotatory input drive, and a plurality of outputs, each for producing a respective rotary output drive in response to the rotatory input drive, the rotary output drives being differentially related to one another, the differential drive arrangement comprising:
- a planetary carrier means for receiving the rotatory input drive;
- a plurality of planetary gears coupled to said planetary carrier means, said planetary gears being rotatable in a plane of rotation;
- a sun gear for meshing with said plurality of planetary gears, said sun gear being rotatable in a plane of rotation that is parallel to that of said planetary gears;
- a first output shaft for providing a first one of the rotary output drives, said first output shaft being coupled to said sun gear, and being rotatable about an axis that is orthogonal to said plane of rotation of said sun gear;
- a ring gear for meshing with said plurality of planetary gears, said ring gear being arranged to rotate coaxially with said sun gear;
- a first bevel sun gear arranged concentrically with said first output shaft and to rotate in a plane of rotation orthogonal to said axis of said first output shaft;
- a second output shaft for providing a second one of the rotary output drives, said second output shaft being coupled to said first bevel sun gear, and being coaxial with said first output shaft;
- a second bevel sun gear arranged concentrically with said first output shaft and to rotate in a plane of rotation parallel to that of said first bevel sun gear;
- a third output shaft for providing a third one of the rotary output drives, said third output shaft being coupled to said second bevel sun gear, and being coaxial with said first output shaft;
- a planetary bevel gear for meshing with said first and second sun bevel gears, said planetary bevel gear being arranged to rotate about its own axis in a plane of rotation that is orthogonal to the planes of rotation of said first and second bevel sun gears; and
- carrier means affixed to said ring gear for rotating therewith, said carrier means being further coupled to said planetary bevel gear, said planetary bevel gear being revolved about said axis of rotation of said first output shaft in response to the rotation of said ring gear.

2. The differential drive arrangement of claim 1, wherein there is further provided an input shaft for providing the rotatory input drive.

3. The differential drive arrangement of claim 2, wherein there is further provided a single cavity housing having a first end for receiving said input shaft and a second end for accommodating said first, second, and third output shafts.

4. The differential drive arrangement of claim 1, wherein said first, second, and third output shafts are concentric with respect to one another.

5. The differential drive arrangement of claim 1, wherein there is further provided translation means for convening a rotating motion of one of said output shafts into a linear motion.

6. A differential drive arrangement for distributing mechanical energy produced by a drive motor to a plurality of wheels of a vehicle, the plurality of wheels being arranged in at least a first pair of substantially parallel and coaxial wheels, the differential drive arrangement being of the type having an input shaft for receiving a rotatory input from the drive motor, and a plurality of output shafts, each for producing a respective rotary output drive in response to the rotatory input from the drive motor, the rotary output drives being differentially related to one another, the differential drive arrangement comprising:
- a first compound planar-meshing planetary gear system having a first major sun gear, a first minor sun gear, and a first compound planetary gear meshing with said first major and minor sun gears;
- a second compound planar-meshing planetary gear system having a second major sun gear, a second minor sun gear, and a second compound planetary gear meshing with said second major and minor sun gears;
- input coupling means for coupling said first and second compound planetary gears to the input shaft, said input coupling means further forming a carrier housing intermediate of said first and second planar-meshing planetary gear systems, said carrier housing being rotatable in response to the input shaft;
- a bevel-meshing planetary gear system having first and second bevel-meshing sun gears arranged concentrically and in parallel with respect to one another, and at least one bevel-meshing planetary gear arranged to mesh with said first and second bevel-meshing sun gears, each of said first and second bevel-meshing sun gears being coupled with a respective one of said first and second minor sun gears;
- carrier coupler means for coupling with said bevel-meshing planetary gear and said carrier housing of said input coupling means;
- a first pair of output shafts arranged concentrically with respect to one another and extending in a first direction, each of said output shafts being coupled to a respective one of said first major sun gear and said first bevel-meshing sun gear; and
- a second pair of output shafts arranged concentrically with respect to one another and extending in a second direction, each of said output shafts being coupled to a respective one of said second major sun gear and said second bevel-meshing sun gear.

7. The differential drive arrangement of claim 6, wherein there are further provided:
- first wheel coupling means for coupling at least one of said first pair of output shafts to vehicle; and
- second wheel coupling means for coupling at least one of said second pair of output shafts to a wheel on the other side of the vehicle.

8. A plural output differential of the type having a single input shaft, the plural output differential comprising:
- at least three differentially related output shafts;
- a single housing for substantially enclosing the plural output differential;
- at least two carrier arms disposed within the housing and coupled to the single input shaft;
- an epicyclic gear train stage having:
  - at least two planet gears mounted on said carrier arms,
  - a sun gear for meshing with said planet gears; said sun gear having internal splines,
  - a first output shaft engaged with said internal splines of said sun gear and extending out of said single housing, and
  - a ring gear for meshing with said planet gears;

a carrier arrangement rigidly attached to a said ring gear, said carrier arrangement being freely rotatable about said first output shaft and being mounted on the housing supported on a bearing;

two bevel planet gears contained within said carrier arrangement at diametrically opposite ends thereof and being rotatable on an axis that is orthogonal to that of said first output shaft;

a bearing support cage for rotatably supporting said two bevel planet gears, said bevel planet gears being internally mounted on said bearing support cage, said bearing support cage further being hollow in the direction of said first output shaft so as to allow said first output shaft to pass therethrough;

first and second bevel sun gears for meshing with said two bevel planet gears and arranged to be rotatable about the axis of rotation of said first output shaft, said first and second bevel sun gears being internally splined;

second and third output shafts, said second output shaft being engaged with said internal splines of said first bevel sun gear, and said third output shaft being engaged with said internal splines of said second bevel sun gear, said first, second, and third output shafts being rotatable about a common axis of rotation.

9. The plural output differential of claim 8, wherein there are further provided a plurality of bearings for maintaining said first, second, and third output shafts mutually concentric.

* * * * *